US008447366B2

(12) United States Patent
Ungari et al.

(10) Patent No.: US 8,447,366 B2
(45) Date of Patent: May 21, 2013

(54) CHARGING STATION FOR MOBILE DEVICES THAT ALLOWS ACCESS TO DEVICE SERVICES

(75) Inventors: Joseph Ungari, Seattle, WA (US); Winston Wang, Bellevue, WA (US); Robert Buck, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 880 days.

(21) Appl. No.: 12/130,627

(22) Filed: May 30, 2008

(65) Prior Publication Data

US 2009/0298553 A1    Dec. 3, 2009

(51) Int. Cl.
*H04B 1/38*     (2006.01)
(52) U.S. Cl.
USPC ........................................................ 455/573
(58) Field of Classification Search
USPC ............ 455/74.1, 552.1, 554.2, 556.1, 556.2, 455/557, 566, 573, 158.4
See application file for complete search history.

(56) References Cited

U.S. PATENT DOCUMENTS

| 6,201,957 | B1 * | 3/2001 | Son et al. ....................... 455/406 |
| 6,825,669 | B2 | 11/2004 | Raichle et al. |
| 2002/0119800 | A1 * | 8/2002 | Jaggers et al. ................ 455/550 |
| 2004/0210933 | A1 * | 10/2004 | Dresti et al. .................... 725/40 |
| 2006/0052141 | A1 | 3/2006 | Suzuki |
| 2007/0036154 | A1 | 2/2007 | Lipman |
| 2007/0114967 | A1 * | 5/2007 | Peng ............................. 320/101 |
| 2007/0279002 | A1 | 12/2007 | Partovi |

OTHER PUBLICATIONS

Miller, Paul, "Sony Ericsson and Fossil team up for Bluetooth watch," Engadget, Sep. 28, 2006, pp. 1-16, Weblogs, Inc. http://www.engadget.com/2006/09/28/sony-ericsson-and-fossil-team-up-for-bluetooth-watch/ [Internet accessed: Jul. 22, 2009].
Quilty-Harper, Conrad, "Sony Ericsson's MBW-100 Bluetooth watch reviewed," Engadget, Oct. 28, 2006, pp. 1-10, Weblogs, Inc. http://www.engadget.com/2006/10/28/sony-ericssons-mbw-100-bluetooth-watch-reviewed/ [Internet accessed: Jul. 20, 2009].
"Bluetooth Headset User Manual: Jabra BT800," 2004, pp. 1-41, Jabra Corporation, United States of America.
International Search Report and Written Opinion for PCT/US2009/045531; Applicant: T-Mobile USA, Inc.; Date of Mailing: Jul. 14, 2009, 12 pages.

* cited by examiner

*Primary Examiner* — Temica M Beamer
*Assistant Examiner* — Joel Ajayi (57) ABSTRACT

A charging station for mobile devices that allows a user to access mobile device services while a mobile device is contacting a charging pad or is otherwise being charged at the charging station. The charging station includes a charging pad where a mobile device is placed to initiate automatic charging without having to connect the mobile device to a charging cable. The charging station also includes a display and communication components for wirelessly linking the charging station with the mobile device. When the mobile device is within proximity of the charging station, the charging station establishes a connection with the mobile device to allow the services offered by the mobile device to be accessed via the charging station. The display on the charging station may be larger than the display of the mobile device or may be configured with different dimensions than the display on the mobile device.

29 Claims, 8 Drawing Sheets

CHARGING STATION FOR MOBILE DEVICES THAT ALLOWS ACCESS TO DEVICE SERVICES

BACKGROUND

When mobile devices, such as mobile telecommunications devices (e.g., mobile phones, personal digital assistants (PDAs), portable email devices, Blackberrys, etc.), personal media players, or like devices are being charged, they are typically not used by a user. A user's hesitancy to use a mobile device during charging periods may arise for different reasons. In some situations, the power cord used to connect a mobile device to a power outlet may be too short to allow a user to comfortably use the device. In some situations, the power outlet used to charge the device may be in a location that isn't conducive to use of the device. For example, the power outlet may be located in a high traffic area like a kitchen where a user may not feel comfortable holding a conversation for a long period of time or where the general noise level may make it difficult to use the device. And in some situations, a mobile device may be charged in a location where there are more convenient options for communication or other services offered by the mobile device. For example, rather than use a mobile telecommunications device (e.g. a mobile phone), a user may be more inclined to use a landline phone at his/her residence because of the convenience of the landline phone. As another example, rather than use a PDA to access a weather service and obtain a weather forecast, a user may be more inclined to use a home computer or turn on a television to obtain a weather forecast. By limiting the use of a mobile device during charging periods, users cannot fully take advantage of the services that are provided by the mobile device. As a result, it would be advantageous to improve on the manner and circumstances in which mobile devices can be utilized.

DETAILED DESCRIPTION

A charging station for mobile devices that allows a user to access mobile device services while a mobile device is being charged at the charging station or is located adjacent the charging station is disclosed. The charging station includes a charging pad where a mobile device is placed to initiate automatic charging without having to connect the mobile device to a charging cord or cable. The charging station also includes a display and communication components for wirelessly linking the charging station with the mobile device. When the mobile device is within proximity of the charging station, the charging station establishes a connection with the mobile device to allow the services offered by the mobile device to be accessed via the charging station. For example, if the mobile device is a mobile phone, a user may make calls from the charging station by accessing the address book of the mobile phone, selecting a number to call, and placing the call from the charging station. The charging station thereby greatly extends the usability of a mobile device in a home, business, or other setting.

In some embodiments, the display on the charging station may be larger than the display of the mobile device or may be configured with different dimensions than the display on the mobile device. As a result, the charging station display may portray multiple services, may portray a greater amount of information for a single service, or may format information in a different fashion for presentation to a user. The display of the charging station thereby enhances the amount and type of data that may be accessed by the user using the services of the mobile device.

In some embodiments, the charging pad of the charging station may be replaced with a dock or traditional cable that allows the mobile device to be connected to a power supply for recharging. While less convenient than the charging pad, a dock or traditional cable require no modifications to mobile devices in order to allow device charging.

In some embodiments, the charging station offers access to services offered by other nearby devices. For example, the charging station may include communication components for wirelessly linking the charging station with a computer or other Internet appliance that is located in close proximity to the charging station. A user may use the charging station to establish a connection with the proximate device and access the services offered by the device via the charging station. Although the charging station may offer minimal functionality on its own, the charging station therefore provides an interface to other proximate devices that are able to offer useful services to a user.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
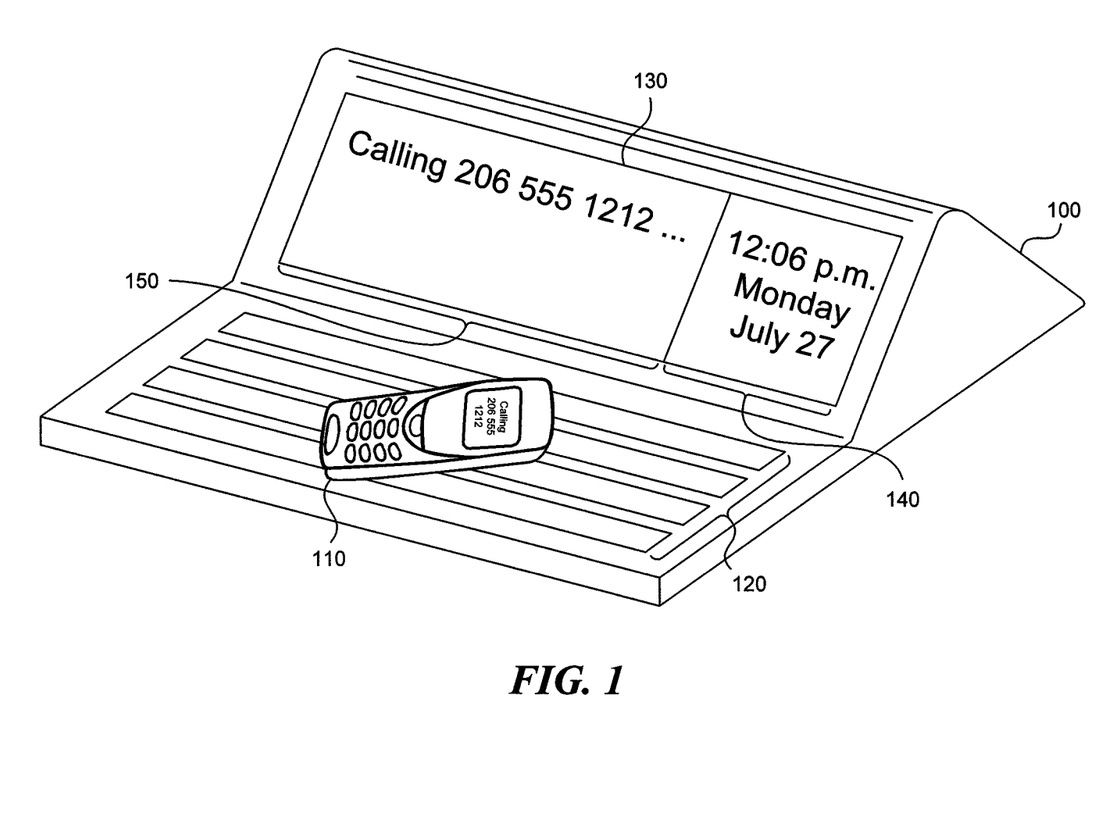
FIG. 1 is a perspective diagram of a charging station with a mobile device positioned on the charging station for charging.

FIG. 1 is a perspective diagram of a charging station 100 that allows a mobile device 110 to be charged while at the same time allowing a user to access communication or other services that are offered by the mobile device or by another device. The mobile device 110 may be a mobile telecommunications device (e.g., a mobile phone, a personal digital assistant (PDA), a portable email device, a Blackberry, etc.), a personal media player such as an iPod or Zune, or any other mobile device having batteries and offering services via a wireless connection. The charging station 100 includes a charging pad 120 upon which a mobile device is placed to engage the charging station's charging features. Various technologies may be used to automatically implement cordless charging. In some embodiments, the charging pad 120 is comprised of a plurality of conductive strips through which current may flow. A mobile device is configured with a plurality of contact points that protrude from the case of the mobile device and which come into contact with two or more of the plurality of conductive strips when the mobile device is placed on the conductive pad. The connection formed between the contact points and the conductive strips allow current to flow from the charging pad to the mobile device, which may be used to charge the batteries of the mobile device. Such contact-point-based charging pad technology is offered by WildCharge, Inc. of Scottsdale, Ariz. and sold under the WildCharge™ brand. In some embodiments, the charging pad 120 operates using magnetic induction. A varying magnetic field is generated by the charging pad. A mobile device placed on the charging pad is brought within the magnetic field, and current is inductively induced in a receiver that is built into the mobile device and used to charge the batteries of the mobile device. Such magnetic-field-based charging pad technology is offered by Splashpower Ltd. of Cambridge, UK, and sold under the Splashpower™ brand. It will be appreciated that other cordless charging technologies may be used to construct the charging pad 120.

While only a single mobile device 110 is depicted in FIG. 1 as being charged on the charging pad 120, two or more mobile devices may be charged at the same time. The number of mobile devices that may be simultaneously charged depends on the size of the charging pad, the size of each mobile device, and the cordless charging method used by the charging pad. Moreover, although the charging station 100 depicted in FIG. 1 has only a single charging pad based on a single charging pad technology, it will be appreciated that the charging station may have two or more charging pads based on the same or different charging pad technologies. The use of multiple technologies to implement the charging pad allows the charging station to accommodate a greater range of mobile devices.

Figure 2:
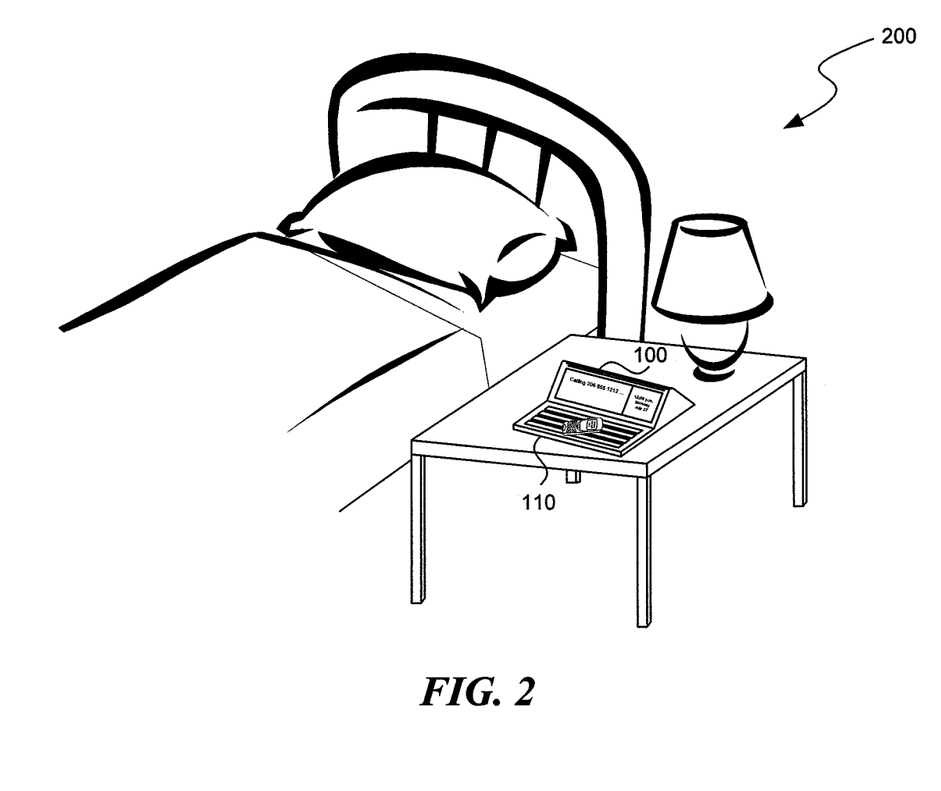
FIG. 2 is a perspective diagram of a charging station for mobile devices used in a consumer setting.

In addition to a charging pad 120, the charging station 100 includes a display 130, which in some embodiments is a touchscreen display. The touchscreen display may be a Liquid Crystal Display (LCD), an Organic Light-Emitting Diode (OLED) display, a Liquid Crystal on Silicon (LCOS) display, etc. As will be described in additional detail herein, the charging station includes communication components that enable services of the mobile device or of other proximate devices to be accessed via the display. For example, if the mobile device being charged is a mobile phone, a user may use the charging pad 120 to make a telephone call by accessing the address book of the mobile phone via the charging pad's display 130, selecting a number to call, and placing the call. As another example, a user may use the display 130 to look up an address contained in an address book of the mobile device. As another example, a user may use the display 130 to select and play music that is stored in a media player mobile device. When a mobile device is not present on the charging station, the display allows a user to access functionality that is resident in the charging station. For example, the charging station may include a clock component and a radio tuner. When a mobile device is absent, the user may view the time or listen to a radio station using the charging station. FIG. 2 depicts, for example, a bedroom environment 200 in which the charging station is used as a clock radio.

The charging station 100 allows a user to select options or enter text by various interfaces that are presented on the display 150. If the display is a touchscreen, the user may select options by touching icons or operating controls that are present on the display. To allow a user to enter text, the charging station may present a keyboard or other text-entry interface on the display. In embodiments where the display is not a touchscreen, a keypad, buttons, knobs, or other controls may be used on the charging station to allow a user to select functions or enter text. For example, one or more keys may be deployed around the periphery of the display 150, and the user may select a key that corresponds to text that is displayed adjacent to that key on the display.

The display 130 on the charging station is typically larger than the display that is contained on the mobile device 110. As a result, the display 130 may be used to display a greater amount of information than would normally be viewable on a single screen of the mobile device. To take advantage of this capability, in some embodiments the display may be partitioned into a number of regions that each has a different purpose. For example, the display 130 shown in FIG. 1 has been partitioned into a first region 140 that is devoted to displaying the time and date, and a second region 150 that is currently being used to depict the status of a phone call being made by a user through the mobile device. As another example, the first region may be devoted to one mobile device service (e.g., an address book) while the second region may be devoted to another service (e.g., a chat application). It will be appreciated that a greater or lesser number of regions may be displayed to a user, and the purpose of each region may be fixed or may be dynamically changed over time.

While the charging pad 120 is depicted as extending in front of the display 130 in FIG. 1, it will be appreciated that the charging pad may instead extend to the side of, behind, above (e.g., on a top surface) or beneath (e.g., in a shelf or opening) the display. Since it is not necessary for a user to be able to see or manipulate the mobile device 110 while the device is on the charging pad, the charging pad may be placed in any location that minimizes any interference with the operation of the display 130 or any associated controls on the charging station. The charging pad may also be placed in a location that maximizes the aesthetic aspects of the charging station.

Figure 3:
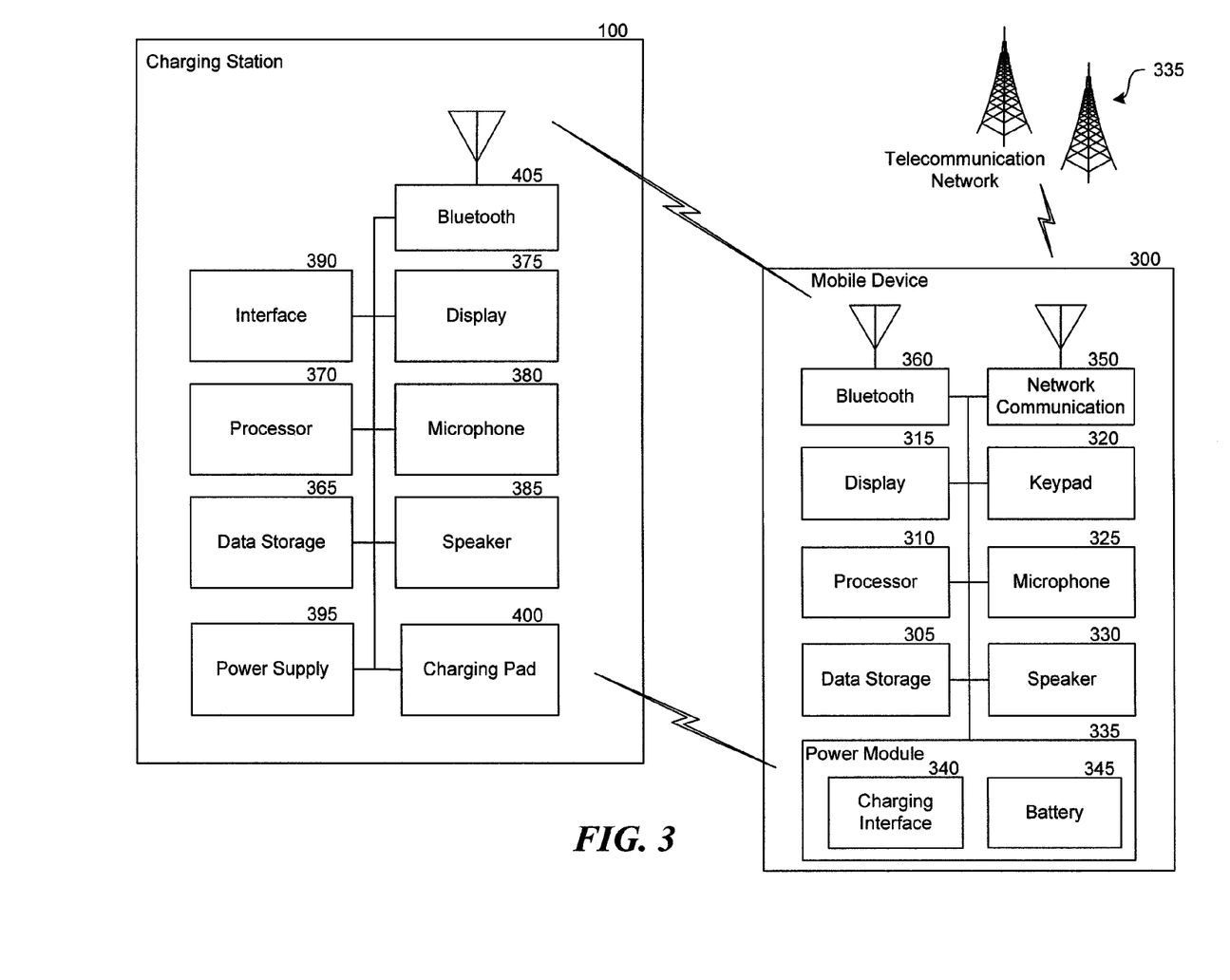
FIG. 3 is a block diagram of components in a charging station and in a mobile device to enable charging of the mobile device and the use of services offered by the mobile device.

FIG. 3 is a block diagram of various components in the charging station 100 and a mobile device, in the depicted example a mobile phone 310, that enable charging of the mobile device and the use of services offered by the mobile device through the charging station. The mobile phone 300 includes a data storage medium component 305 (e.g., hard drive, flash memory, memory card, etc.) that stores content and other data (e.g., processing instructions, configuration settings, etc.), and a processor 310 for executing processing instructions and implementing phone services. To allow a user to interact with and use the communication and other services of the mobile phone, the mobile phone may include a display 315, a keypad or touchpad 320, a microphone 325, and a speaker 330. A power module 335 having a charging interface 340 and a battery 345 provide power to the mobile phone. As discussed above, the charging interface 340 may be based on cordless charging technologies such as contact-point or magnetic field charging.

The mobile phone 300 includes two communications components. The mobile phone includes a Bluetooth component 360 or other communication component that implements a short-range communication protocol (e.g., WiFi, Ultra-wideband, ZigBee, infrared, etc.). The mobile phone 300 also includes a network communication component 350 that enables the mobile phone to communicate by transmitting and receiving wireless signals using licensed, semi-licensed or unlicensed spectrum over a telecommunications network 355. Telecommunications networks include third-party telecommunications networks such as a Global System for Mobile (GSM) mobile telecommunications network, a code/ time division multiple access (CDMA/TDMA) mobile telecommunications network, a 3rd Generation (3G) mobile telecommunications network (e.g. General Packet Radio Service (GPRS/EGPRS), Enhanced Data rates for GSM Evolution (EDGE), or Universal Mobile Telecommunications System (UMTS)), or other telecommunications network. Those skilled in the art will appreciate that various other components (not shown) may be included in the mobile phone to enable network communication. For example, if the mobile phone is configured to communicate over a GSM mobile telecommunications network, the mobile phone may include a Subscriber Identity Module (SIM) card that stores an International Mobile Subscriber Identity (IMSI) number that is used to identify the mobile phone on the GSM mobile telecommunications network. If the mobile phone is configured to communicate over another telecommunications network, the mobile phone may include other components that enable it to be identified on the other telecommunications network. In some embodiments, the mobile phone 300 includes components that enable it to connect to a telecommunications network using Generic Access Network (GAN) or Unlicensed Mobile Access (UMA) standards and protocols. For example, the mobile phone may include components that support Internet Protocol (IP)-based communication over a Wireless Local Area Network (WLAN) and components that enable communication with the telecommunications network over the IP-based WLAN.

With the exception of the charging interface 340 that is unique to the type of cordless charging technology that is being used, the components in the mobile phone 300 are therefore those that are typically found in most mobile phones. The mobile phone may contain application programs that allow a user to access various services that are local to the phone. For example, the mobile phone may contain an application that is stored in the phone memory and that allows a user to play a game on the mobile phone even if the mobile phone is not connected to a telecommunication network. The mobile phone may also contain an operating system or applications that allow a user to access various services that are not located on the phone. For example, the mobile phone may allow a user to access an address book or pictures that are stored on a remote server that is accessed through a telecommunication network. Further, the mobile phone may contain data files consisting of images or video that may be displayed on the mobile phone's display.

While the mobile phone 300 depicted in FIG. 3 contains components that enable both short and long range communications, it will be appreciated that other mobile devices 110 may incorporate components that implement only short range communications. For example, a mobile media player device may only offer short range communication capability via protocols such as Bluetooth, WiFi, Ultra-wideband, ZigBee, infrared, etc.

Turning to the charging station 100, the charging station includes a data storage medium component 365 (e.g., hard drive, flash memory, memory card, etc.) that stores content and other data (e.g., processing instructions, configuration settings, etc.), and a processor 370 for executing processing instructions. To allow a user to interact with the charging station and gain access to the communication and other services of the mobile device, the charging station includes the display 130, a microphone 380, and one or more speakers 385. The charging station may include various user interface controls 390 (e.g., keypad, buttons) to allow a user to select functions and enter data. If the display 130 is a touchscreen display, however, the interface controls 390 may be omitted or limited and the display used as the primary mechanism to allow a user to select functions and enter data. The charging station 100 also includes a power supply 395 that is coupled to the charging pad 120. The charging station is typically plugged into an electrical outlet, and the power supply regulates the power and converts the power into a form that is required by the charging pad. As discussed above, the charging pad 120 may utilize one of a variety of cordless charging technologies, such as contact-point or magnetic field charging.

The charging station 1000 includes at least one communications component. For instance, the charging station 100 may include a Bluetooth component 405 to allow the charging station to communicate with a mobile device. In lieu of or in addition to the Bluetooth component, the charging station may include any other communication components that operate using a short-range communication protocols (e.g., Wi-Fi, Ultra-wideband, ZigBee, infrared, etc.) that are necessary to communicate with a mobile device or with other proximate devices. In some embodiments, the charging station may include multiple short-range communication components in order to enable the charging station to communication with a broad range of mobile devices and other proximate devices.

The components depicted in FIG. 3 create two interfaces between the charging station 100 and the mobile phone 300. The first interface is a charging interface 375 that is established between the charging pad 120 of the charging station and the charging interface 340 of the mobile phone. The charging interface 375 allows the mobile phone to engage the charging station 100 charging features, permitting the battery 345 of the mobile phone to be charged from power provided by charging station. The charging is performed cordlessly and automatically when the mobile phone is brought into close proximity or into contact with the charging pad. The second interface is a communications interface 399 that is established between, for instance, the Bluetooth module 405 of the charging station and the Bluetooth module 360 of the mobile phone. The communications interface allows the charging station to wirelessly exchange data and commands with the mobile phone. The communications interface thereby allows a user of the charging station to access communications and other services that are offered by the mobile phone.

In some embodiments, the components depicted in FIG. 3 also create an interface between the charging station 100 and other proximate devices (not shown) such as a computer or Internet appliance. A communications interface may be established between the charging station and one or more proximate devices via Wi-Fi or other short-range communication protocols. The communications interface allows the charging station to wirelessly exchange data and commands with the proximate device. The communications interface thereby allows a user of the charging station to access communications and other services that are offered by the proximate device(s).

Figure 4:
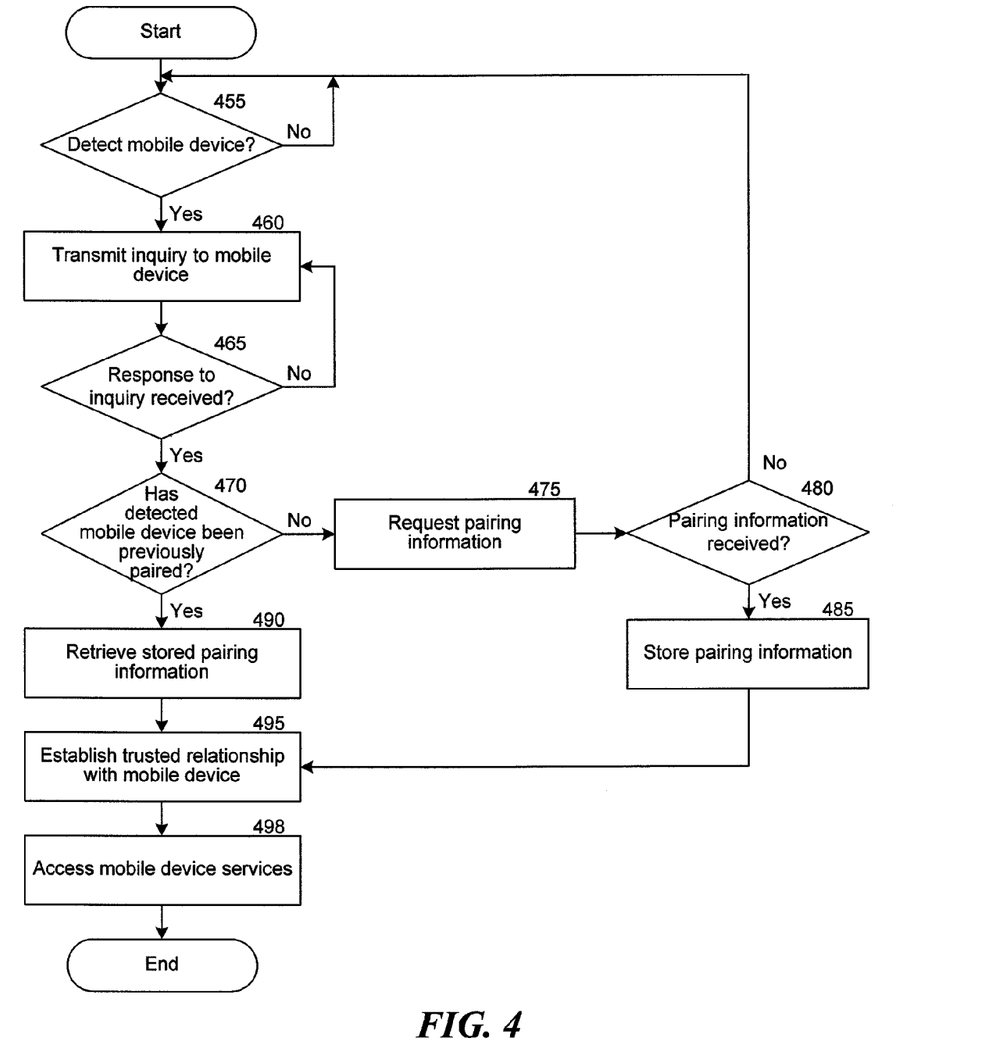
FIG. 4 is a flow chart of a process for detecting a mobile device and services offered by the mobile device.

FIG. 4 is a flow chart of a process 450 implemented by the charging station 100 to detect a mobile device 110 (such as a mobile phone 300), to ascertain services offered by the mobile device, and to pair with the mobile device in order to utilize the services offered by the mobile device. At a decision block 455, the charging station 100 waits to detect that a mobile device has been placed on (i.e., has been engaged with) the charging pad 120 for charging. In some embodiments, the charging station is able to detect such engagement as a result of periodic beacon signals transmitted by the charging station and/or mobile device. In some embodiments, the charging station is able to detect such engagement as a result of detection of additional weight placed on the charging pad 120. In some embodiments, the charging station is able to detect such engagement by monitoring the delivery of power via the charging pad (e.g., when charging is detected, it is presumed that a mobile device is present). At a block 460, the charging station transmits an inquiry to the mobile device in which it requests the device name, device class, list of services and other technical information about the device. At a decision block 465, the charging station waits to receive a response from the mobile device. If a response is not received within a certain time period, the charging pad will transmit another inquiry to the mobile device at block 460. If a response is received from the mobile device within a certain time period, processing continues to decision block 470.

At decision block 470, the charging station determines whether it has previously paired with the mobile device. The determination may be made by comparing the identification information received in the response from the mobile device with a table of previously-paired devices that is stored in the data storage area 365. If the mobile device has not been previously paired with the charging station, processing continues to block 475 where the charging station requests pairing information from the user. The pairing information enables the charging station and the mobile device to establish a trusted relationship. At a decision block 480, the charging station waits to receive pairing information from the mobile device. If pairing information is received from the mobile device (i.e., if pairing information is confirmed by a user), at a block 485 the pairing information is stored in the data storage area 365 for future reference. Processing then continues at block 495. If at decision block 470 it is determined that the mobile device has been previously paired with the charging station, processing continues to block 490 where the charging station retrieves stored information from the data storage area 365 that allows the charging station to pair with the mobile device. At block 495, the charging station establishes a trusted relationship with the mobile device. The trusted relationship may or may not involve the encryption of data that is exchanged between the charging station and the mobile device.

At a block 498, the charging station is allowed to access communication and other services offered by the mobile device. The number and type of services that the charging station is allowed to access will depend on the type of mobile device and the specific user or manufacturer settings of the mobile device. Services that may be accessed include communication services (e.g., voice, text), calendars, address books, notes, reminders, media (e.g., pictures, music, video) or any other services that may be implemented on a mobile device or that are accessible through a mobile device.

At a block 498, the charging station is allowed to access communication and other services offered by the mobile device. The number and type of services that the charging station is allowed to access will depend on the type of mobile device and the specific user or manufacturer settings of the mobile device. Services that may be accessed include communication services (e.g., voice, text), calendars, address books, notes, reminders, media (e.g., pictures, music, video) or any other services that may be implemented on a mobile device or that are accessible through a mobile device.

Figure 5:
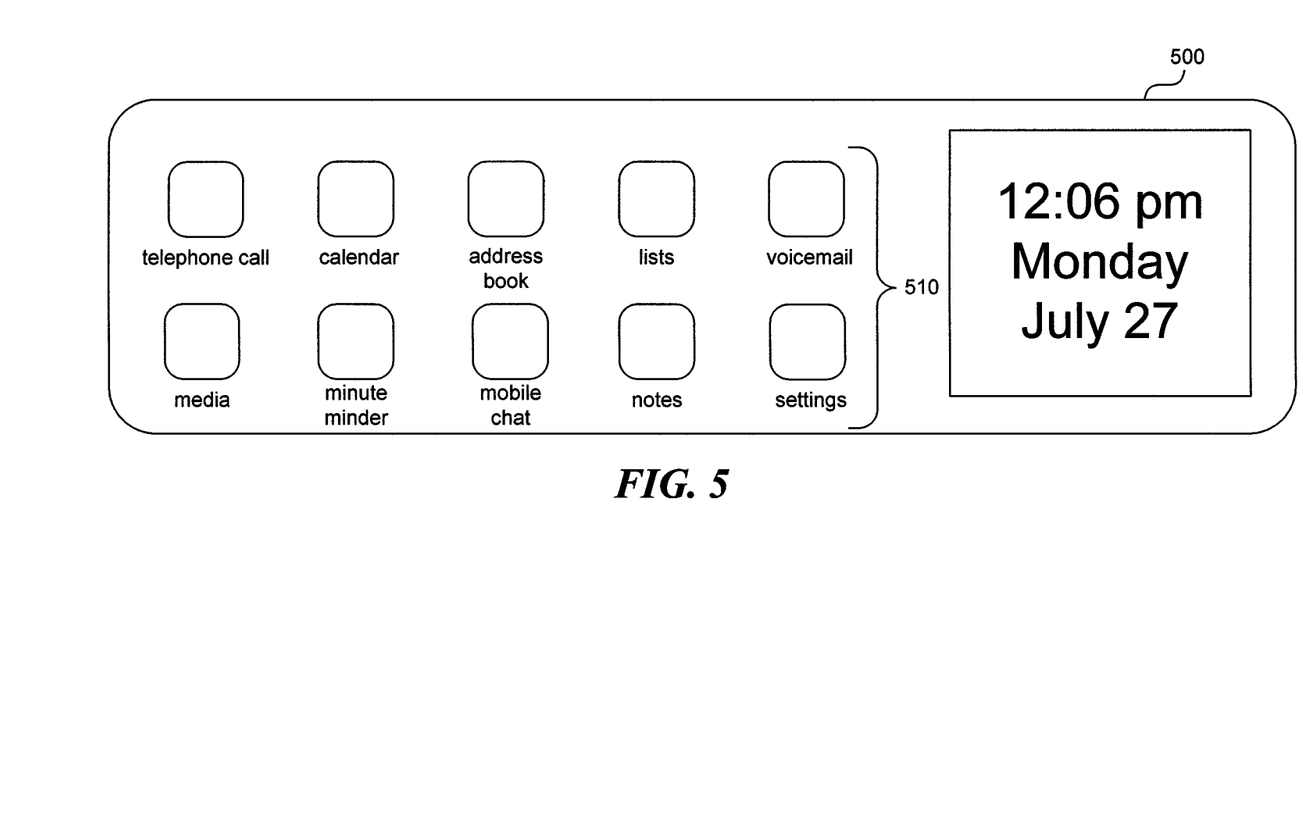
FIG. 5 is a representative user interface on the charging station to allow a user to access services offered by the mobile device.

FIG. 5 is a representative user interface 500 that may be presented on the charging station display 130 to allow a user to access services offered by the mobile device. The user interface may be a duplicate of the user interface that is presented on the mobile device, although scaled or truncated to fit the display of the mobile device. Alternatively, the user interface may be a reformatted or enhanced user interface that is mapped to the user interface of the mobile device. The interface depicts a number of icons 510, each icon being associated with a service available on the mobile device. A user may select a service by pressing the appropriate icon on the touchscreen of the charging station. For example, the user may access the voicemail of the mobile device by selecting the "voicemail" icon. As another example, the user may access pictures and videos stored on the mobile device by selecting the "media" icon. While nine icons are displayed in the representative interface 500, it will be appreciated that a greater or lesser number of icons may be displayed by the charging station. When the charging station detects that an icon has been selected, the charging station issues an appropriate command to the mobile device via the communications interface 399. The mobile device transmits responsive service data to the charging station if the data is stored locally on the mobile device, or accesses a remote service via the telecommunications network 355 if the service involves remote data or communication with another party. By exchanging data with the charging station over the communications interface 399, the mobile device enables the user to remotely access services that are typically accessed using the mobile device.

In some embodiments, the software necessary to offer a service to a user may entirely reside on the mobile device 110 and only user interface data is transmitted to the charging station. In some embodiments, the charging station may include software that executes on the charging station and that aids in offering a service to the user. For example, the charging station may execute a user interface application that reformats, enhances, or supplements data received from the mobile device for display on the charging station display. As another example, the charging station may execute a data compression algorithm to speed the transmission of data over the wireless communications link. Those skilled in the art will appreciate that software functionality may be advantageously divided between the station and the device to improve performance. In some embodiments, the majority of the services that a user accesses at a charging station are services that are offered via a mobile device. In some embodiments, the charging station may offer a significant number of local services to a user and a limited number of services may be accessed via a mobile device.

In some embodiments, the software on the charging station may allow a user to access a number of services offered by the mobile device and integrate the data received from the accessed services for simultaneous display on the charging station display 130. For example, the charging station may display a menu to allow a user to make a phone call at the same time as a calendar is being displayed. On the mobile device, the phone call and the calendar are normally accessed via different menu screens, but because of the larger display size on the charging station the menu and calendar may be brought together and displayed on the same screen.

In some embodiments, the software on the charging station acts as an intermediary between a mobile device and a proximate device such as a computer or an Internet appliance. For instance, the charging station may be configured to signal a proximate device whenever a mobile device is within range of and establishes communications with the charging station or when a mobile device commences charging via the charge pad.

In some embodiments, a mobile device user is allowed to limit the services that may be accessed from a charging station. For example, the mobile device user may desire to limit the ability to make long distance telephone calls using a charging station. The mobile device may therefore provide a settings management menu to allow a user to enable or disable services that are to be offered through the charging station.

Figure 6A:
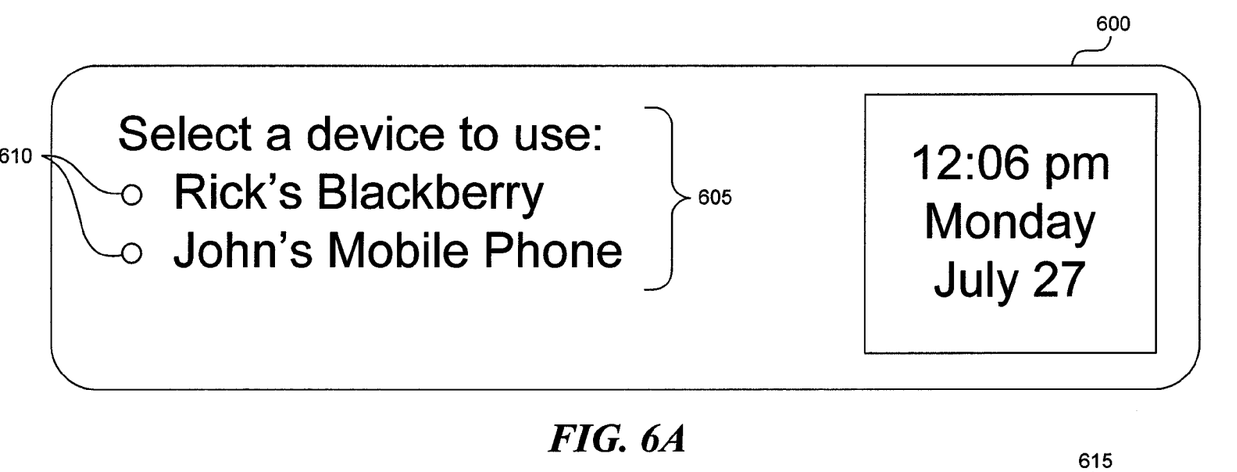
FIGS. 6A-6D are representative screenshots of a user interface which depict a user accessing an address book and communication service through the mobile device.

FIGS. 6A-6D are screenshots of a representative interface that is presented on the charging station display 130. The screenshots depict a series of screens that a user might use to access a communication service through a mobile device. FIG. 6A depicts a first screen 600 that allows a user to select a device. If more than one mobile device has engaged the charging system of the charging station, a user may initially need to select which device the user would like access. In the depicted example, two mobile devices are identified in a message 605 that is displayed to a user. The devices may be identified by device type (e.g., Samsung Beat, Nokia 6103, Motorola RAZR), by nickname (e.g., "Rick's phone"), by user name associated with the phone (e.g., "John Smith"), by photo, by icon, or by any other identifier. The user may select which device to access by selecting a radio button 610 associated with the device. In some embodiments, the user may be required to enter a password or otherwise verify that they are authorized to use the device before proceeding.

Figure 6B:
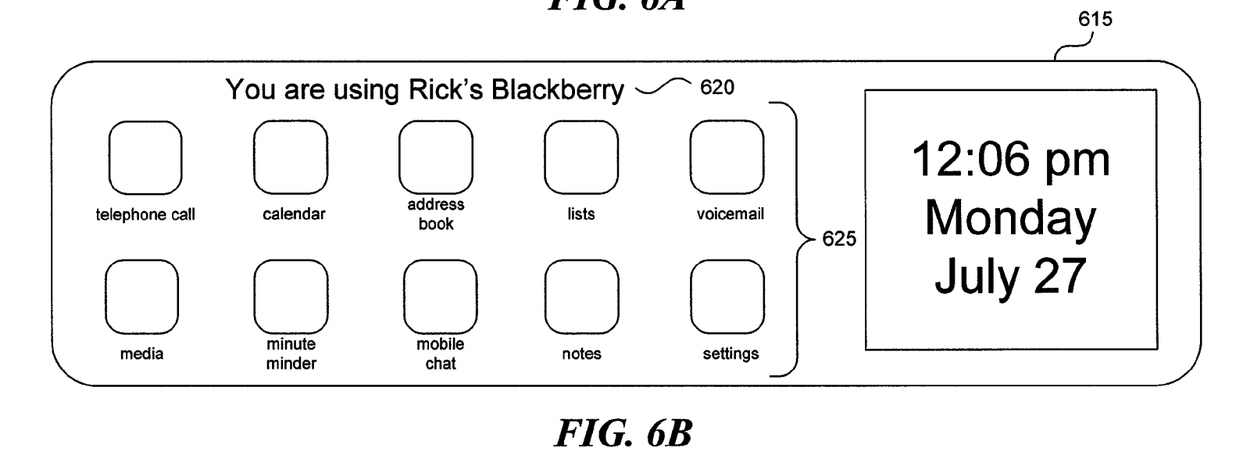

Once a device is selected, the user is presented with a menu of services that may be accessed through the selected device. FIG. 6B depicts a second screen 615 that allows the user to select a service. The second screen identifies which device is being utilized in a banner 620 that appears at the top of the screen. The second screen also depicts a number of icons 625, each icon being associated with a service available on the mobile device. A user may select a service by pressing the appropriate icon on the touchscreen of the charging station. It will be appreciated that the number of services that are displayed will depend on the particular device that is being accessed by the user and other factors.

Figure 6C:
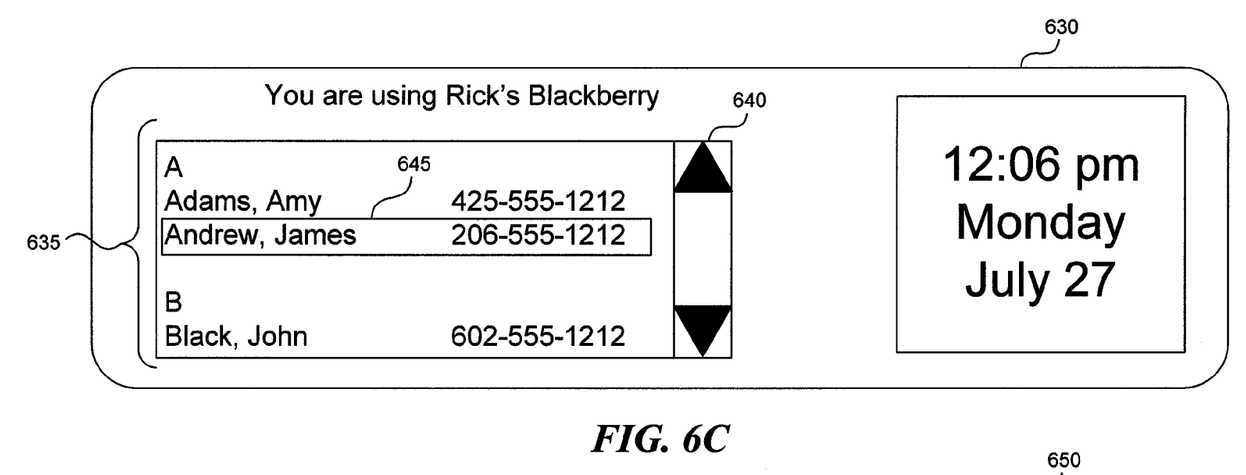

If the user selects one of the services accessible though the mobile device, the user may be presented with a menu associated with the selected service or with data associated with selected service. FIG. 6C depicts a third screen 630 that presents additional details of the selected service. To arrive at the third screen depicted in FIG. 6C, the user selected the "address book" icon from the set of displayed icons 625 in the second screen 615. The user's address book 635 is therefore displayed to the user, sorted alphabetically by last name. The user may scroll within the address book using a scroll bar 640. When a user finds the name of a party that he/she would like to call, the user may select that name by tapping or otherwise selecting the name. In FIG. 6C, the name "James Andrew" has been selected by the user as indicated by the highlighting 645 that is applied to the name after selection.

Figure 6D:
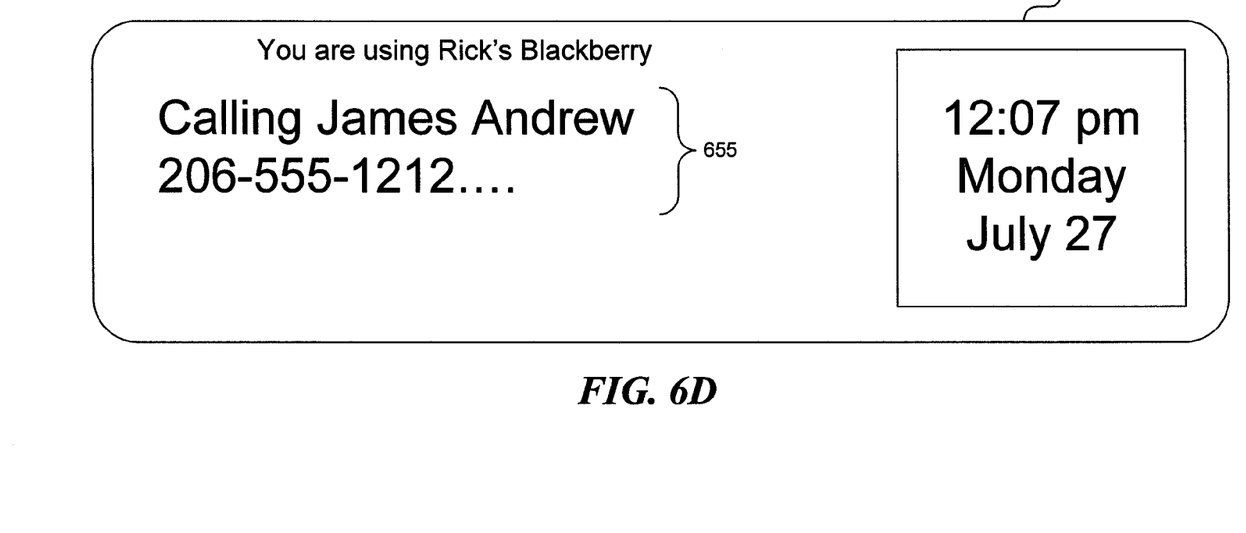

Once the user has selected a name from the third screen 630, the mobile device may be configured to automatically dial the user. FIG. 6D depicts a fourth screen 650 that indicates that a call is being made to "James Andrew." Progress of the call may be displayed to the user in a message 655. Although the selection of the party to call is made on the charging station, the connection to a wireless telecommunications network to complete the call is made by the wireless device. When the call has been initiated, the user may communicate with the other party by speaking into the microphone 380 of the charging station 100 and listening to the other party via the speaker 385 of the charging station. All voice signals are transmitted from the charging station to the mobile device via the Bluetooth connection, before being communicated from the mobile device to the other party via the telecommunication network 355. The charging station thereby increases the opportunity to use mobile device services at times when services would typically go unused, such as during charging periods.

Figure 7:
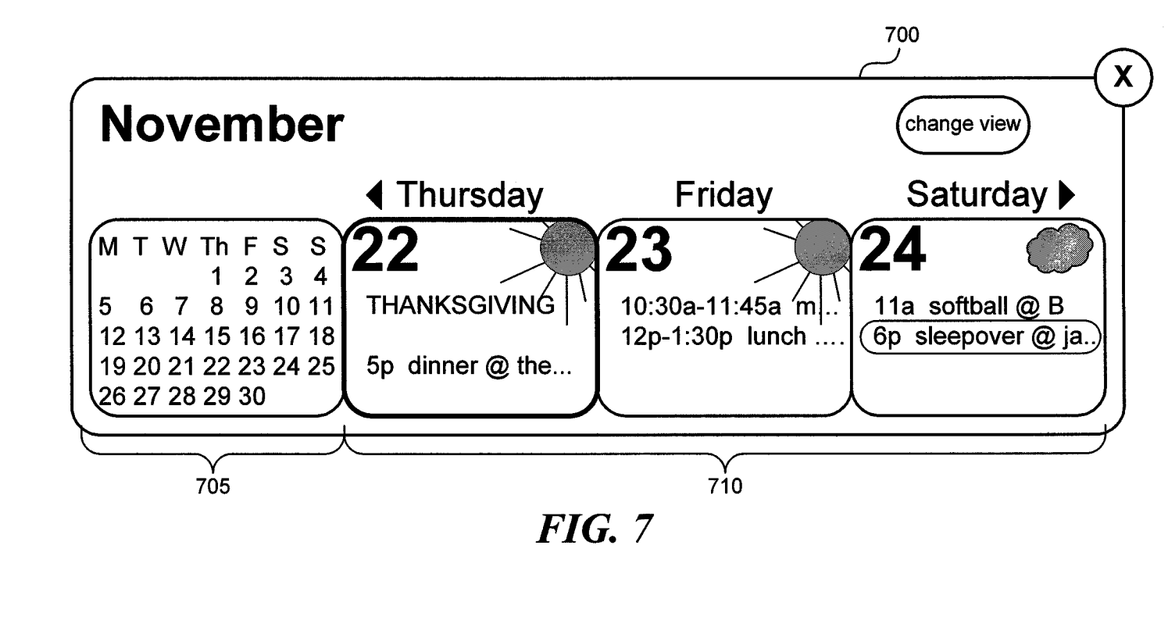
FIG. 7 is a representative user interface which depicts a user accessing a calendar service through the mobile device.

Other mobile device services may, of course, be accessed through the charging station. If, for example, the user selected the icon corresponding to the "calendar" in the set of icons 510, the user would be taken to a calendar that is maintained on the mobile device or in a service utilized by the mobile device. FIG. 7 is a screenshot of an interface 700 to a calendar service. A first region 705 in the interface depicts the month at a glance, so that a user can see and easily select a particular day of the month. A second region 710 of the interface depicts a detailed schedule for three days of the month, with the various activities associated with each day displayed on the schedule. It will be appreciated that the display 120 of the charging station may be significantly larger than the display of the mobile device. As a result, a greater amount of information may be contained in charging station user interfaces when compared to mobile device user interfaces. For example, a mobile device may not be able to depict the first and second regions shown in FIG. 7 in the side-by-side manner that is shown.

From the foregoing, it will be appreciated that specific embodiments of the invention have been described herein for purposes of illustration, but that various modifications may be made without deviating from the spirit and scope of the invention. Although wireless technologies were discussed for use in implementing the charging pad 120, it will be appreciated that various wired solutions may be used in lieu of the charging pad. For example, a dock, a cable, or other coupling component may be used to provide power from the charging station 100 to the mobile device 110 for purposes of recharging the batteries of the mobile device. Accordingly, the invention is not limited except as by the appended claims.

We claim:

1. A charging station for charging a mobile telecommunications device while enabling access to services through the mobile telecommunications device, the charging station comprising:
    a power supply;
    a charging pad coupled to the power supply, the charging pad configured to charge a mobile telecommunications device in proximity to the charging station via a cordless connection;
    a communication component for establishing a wireless communication link with the mobile telecommunications device while the mobile telecommunications device is being charged by the charging pad, the wireless communication link enabling access to at least one service offered by the mobile telecommunications device, the at least one service selected from a voice service, a text message service, a calendar service, an address book service, or a multimedia service;
    a touchscreen display for displaying an icon that depicts at least one service offered by the mobile telecommunications device and for receiving the selection by a user of one of the displayed services by detecting a touch of the user on the icon; and
    a controller coupled to the communication component and to the input component, wherein the controller receives a selection of a service by the user and allows the user to access the selected service offered by the mobile telecommunications device via the wireless communication link.

2. The charging station of claim 1, wherein the charging pad creates a varying magnetic field to induce a charging current in the mobile telecommunications device.

3. The charging station of claim 1, wherein the charging pad provides a charging current to the mobile telecommunications device when conductive contact is made between the mobile telecommunications device and the charging pad.

4. The charging station of claim 1, wherein the communication component communicates via a protocol selected from a set comprising Bluetooth, WiFi, Zigbee, ultra-wideband and infrared.

5. The charging station of claim 1, wherein the selected service is implemented on the mobile telecommunications device.

6. The charging station of claim 1, wherein the selected service is implemented remote from the mobile telecommunications device and accessed via the mobile telecommunications device.

7. The charging station of claim 1, wherein the selected service is accessed after the mobile telecommunications device has been charged.

8. The charging station of claim 1, wherein a portion of the selected service is implemented by the mobile telecommunications device and a portion of the selected service is implemented by the charging station.

9. A charging station for charging a mobile device and displaying a list of services available on the mobile device that a user may access through the charging station, the charging station comprising:
  a power supply;
  a charging component coupled to the power supply, the charging component configured to charge a mobile device in proximity to the charging station via a cordless connection;
  a communication component for establishing a wireless communication link with the mobile device while the mobile device is being charged by the charging component, the wireless communication link enabling access to at least one service offered by the mobile device, the at least one service selected from a voice service, a text message service, a calendar service, an address book service, or a multimedia service;
  a touchscreen display for displaying an icon that depicts at least one service offered by the mobile device and for receiving the selection by a user of one of the displayed services by detecting a touch of the user on the icon; and
  a controller coupled to the communication component and to the input component, wherein the controller receives a selection of a service from a user and accesses the selected service offered by the mobile device via the wireless communication link.

10. The charging station of claim 9, wherein the charging component is a charging pad.

11. The charging station of claim 10, wherein the charging pad creates a varying magnetic field to induce a charging current in the mobile device.

12. The charging station of claim 11, wherein the charging pad provides a charging current to the mobile device when conductive contact is made between the mobile device and the charging pad.

13. The charging station of claim 9, wherein the communication component communicates via a protocol selected from a set comprising Bluetooth, WiFi, Zigbee, ultra-wideband and infrared.

14. The charging station of claim 9, wherein the service is implemented on the mobile device.

15. The charging station of claim 9, wherein the service is implemented remote from the mobile device and accessed via the mobile device.

16. The charging station of claim 9, wherein the display is configured to display the selected service.

17. The charging station of claim 16, wherein the controller receives a selection of a second service from the user and accesses the selected second service on the mobile device via the wireless communication link, and wherein the display is configured to simultaneously display the selected first and second services.

18. The charging station of claim 9, wherein the selected service is accessed after the mobile device has been charged.

19. The charging station of claim 9, wherein the mobile device is a mobile telecommunications device.

20. The charging station of claim 9, wherein a portion of the selected service is implemented by the mobile device and a portion of the selected service is implemented by the charging station.

21. An apparatus for the remote access of a service offered by a mobile device while the mobile device is being charged, the apparatus comprising:
  a charging component configured to charge a mobile device via a cordless connection;
  a communication component for establishing a wireless communication link with the mobile device while the mobile device is being charged by the charging component, the wireless communication link enabling access to at least one service offered by the mobile device, the at least one service selected from a voice service, a text message service, a calendar service, an address book service, or a multimedia service; and
  an interface component for receiving from a user a selection of an icon that depicts at least one service offered by the mobile device, the interface component including a touchscreen display that is utilized by the user to select the icon that depicts the service offered by the mobile device, the interface component accessing the selected service on the mobile device via the wireless communication link and providing the service to the user, wherein the service is accessed from the apparatus using the mobile device.

22. The apparatus of claim 21, wherein the charging component is a charging pad.

23. The apparatus of claim 22, wherein the charging pad creates a varying magnetic field to induce a charging current in the mobile device.

24. The apparatus of claim 23, wherein the charging pad provides a charging current to the mobile device when conductive contact is made between the mobile device and the charging pad.

25. The apparatus of claim 21, wherein the communication component communicates via a protocol selected from a set comprising Bluetooth, WiFi, Zigbee, ultra-wideband and infrared.

26. The apparatus of claim 21, wherein the selected service is accessed after the mobile device has been charged.

27. The apparatus of claim 21, wherein the mobile device is a mobile telecommunications device.

28. The apparatus of claim 21, wherein the interface component further receives from the user one or more commands for controlling the service and transmits the commands to the mobile device via the wireless communication link.

29. The apparatus of claim 21, wherein a portion of the selected service is implemented by the mobile device and a portion of the selected service is implemented by the apparatus.

\* \* \* \* \*

UNITED STATES PATENT AND TRADEMARK OFFICE
CERTIFICATE OF CORRECTION

| | | |
|---|---|---|
| PATENT NO. | : 8,447,366 B2 | Page 1 of 1 |
| APPLICATION NO. | : 12/130627 | |
| DATED | : May 21, 2013 | |
| INVENTOR(S) | : Ungari et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this
Thirtieth Day of December, 2014

Michelle K. Lee
*Deputy Director of the United States Patent and Trademark Office*